US008162785B2

(12) United States Patent
Wagner

(10) Patent No.: US 8,162,785 B2
(45) Date of Patent: Apr. 24, 2012

(54) CONTINUOUSLY VARIABLE CONICAL PULLEY TRANSMISSION WITH TRACTION MECHANISM BELT

(75) Inventor: Peter Wagner, Blabertal (DE)

(73) Assignee: PIV Drives GmbH, Bad Homburg (DE)

( * ) Notice: Subject to any disclaimer, the term of this patent is extended or adjusted under 35 U.S.C. 154(b) by 363 days.

(21) Appl. No.: 12/317,030

(22) Filed: Dec. 18, 2008

(65) Prior Publication Data
US 2009/0156337 A1 Jun. 18, 2009

(30) Foreign Application Priority Data

Dec. 18, 2007 (DE) .......................... 10 2007 061 028

(51) Int. Cl.
F16H 55/56 (2006.01)
(52) U.S. Cl. ................................. 474/8; 474/25; 474/27
(58) Field of Classification Search ........... 474/8, 24–27
See application file for complete search history.

(56) References Cited

U.S. PATENT DOCUMENTS

| 2,677,283 | A |   | 5/1954 | Firth |       |
|-----------|---|---|--------|-------|-------|
| 4,516,964 | A |   | 5/1985 | Laster |      |
| 5,006,092 | A | * | 4/1991 | Neuman et al. | 474/8 |
| 5,728,021 | A |   | 3/1998 | van Rooij et al. | |
| 6,758,775 | B2 | * | 7/2004 | Heinrich et al. | 474/19 |
| 7,037,225 | B2 | * | 5/2006 | Takagi | 474/8 |
| 2002/0077203 | A1 |   | 6/2002 | Wians | |
| 2004/0018903 | A1 |   | 1/2004 | Takagi | |
| 2004/0166971 | A1 | * | 8/2004 | Borghi | 474/17 |

FOREIGN PATENT DOCUMENTS

| DE | 415290 | 6/1925 |
| DE | 415290 C | 6/1925 |
| DE | 1 294 130 B | 4/1969 |
| DE | 2 050 802 A1 | 11/1971 |
| DE | 2 848 167 B1 | 2/1980 |

(Continued)

OTHER PUBLICATIONS

Search Report dated Jun. 16, 2008 issued by the German Patent Office in counterpart German Application No. 10 2007 061 028.0 and English translation thereof.

Primary Examiner — Sang Kim
(74) Attorney, Agent, or Firm — Lucas & Mercanti LLP; Robert P. Michal

(57) ABSTRACT

A continuously variable conical pulley transmission having pairs of conical pulleys which are rotationally fixedly arranged on drive input and drive output shafts and of which in each case one is fixed to the shaft and one is axially movable, and between which a traction mechanism belt for power transmission circulates. In order that it is not necessary to provide otherwise unutilized regions of the conical pulley surfaces to allow for corresponding wear, it is proposed that a stop for limiting the transmission ratio, which stop acts substantially in the radial direction on the traction mechanism belt, be provided in at least one conical pulley pair. It is intended in particular that the peripheral surface of the drive input shaft serves as a stop. It is also proposed that a chain as a traction mechanism belt be correspondingly matched to a device of said type by virtue of the contour of the links of said chain being matched to the contour of the drive input shaft.

8 Claims, 3 Drawing Sheets

FOREIGN PATENT DOCUMENTS

| | | |
|---|---|---|
| DE | 4 215 925 A1 | 1/1993 |
| DE | 100 58 475 A1 | 7/2002 |
| EP | 0741255 | 11/1996 |
| EP | 1656823 | 5/2006 |
| FR | 1.295.478 A | 10/1962 |
| GB | 807447 | 1/1959 |
| JP | 01193452 A * | 8/1989 |
| JP | 2006-226450 | 8/2006 |

* cited by examiner

CONTINUOUSLY VARIABLE CONICAL PULLEY TRANSMISSION WITH TRACTION MECHANISM BELT

CROSS-REFERENCE TO RELATED APPLICATION

This application claims priority under 35 USC 119 from German Patent Application No. DE 10 2007 061 028.0 filed Dec. 18, 2007, the entire disclosure of which is incorporated herein by reference.

FIELD OF THE INVENTION

The invention relates to a continuously variable conical pulley transmission having pairs of conical pulleys which are rotationally fixedly arranged on drive input and drive output shafts and of which in each case one is fixed to the shaft and one is axially movable, and between which a traction mechanism belt for power transmission circulates.

BACKGROUND INFORMATION

Conventionally, the adjustment of conical pulleys is effected by means of hydraulic, axially-acting tensioning means which are apportioned pressure medium by a pump via a control valve in order to set and maintain the transmission ratio.

There are however also continuously variable conical pulley transmissions which are adjusted mechanically.

Here, the chain-type converter has a fixed ratio range which is dependent in particular on the length of the traction mechanism and also on the maximum opening extent of a disk set. The maximum opening extent of a disk set is assumed when the axially movable conical pulley is opened to the maximum degree. The maximum opening extent is determined here by means of a stop. On account of the geometric relationships, the minimum running radius of the traction mechanism and therefore ultimately the extreme transmission ratios of the chain-type converter transmission are co-determined by the maximum opening extent of a disk set. Here, the maximum opening extent of the drive output disk set determines the overdrive transmission ratio, while the maximum opening extent of the drive input disk set determines the underdrive transmission ratio.

A mechanical delimitation of the ratio range of a corresponding conical pulley transmission is thus possible by means of the precise positioning of the stops against which the movable disks abut at their maximum opening extent. Since the angle of the conical pulleys is approximately 10°, the corresponding minimum and maximum running circle varies with a ratio of 1:3 in the event of a movement of the stop. It can therefore be seen that there is a very high requirement for the stop to be mounted with a high degree of positioning accuracy.

The running circle is however also influenced in the same way by the width of the traction mechanism. In the case of a chain, as is disclosed for example by DE-A 1 294 130 or DE patent 28 48 167, said width corresponds to the length of corresponding rocker pins via which the transmission of force from the traction mechanism belt to the conical pulleys takes place.

The width of the traction mechanism belt is subject to variation on account of wear of said rocker pins, such that the running circle can likewise vary corresponding to the above-described geometrical relationships.

Here, the change in the running circle associated with the wear of the traction mechanism belt moves the entire ratio range of the conical pulley transmission in the direction of underdrive. Here, however, the lowest possible underdrive transmission at the same time becomes smaller (transmission ratio=1/i=$n_2/n_1$)

Electronic transmission ratio regulators which are provided nowadays are duly capable of predefining the starting transmission ratio as a setpoint value upon start-up of a corresponding conical pulley transmission. A corresponding setting of said starting transmission ratio is however only possible once the transmission rotates and the actual value is thus available from corresponding rotational speed signals of the drive input and drive output shafts. In practice, this has the result that the first rotations of a conical pulley transmission until the intervention of the electronic transmission ratio regulation take place initially at the mechanical end transmission ratio.

It may therefore be the case that, in transmissions which intentionally have a ratio range restriction, the transmission operates in an explicitly undesired range.

In specific applications of conical pulley transmissions, for example in the case of a power split in a combination of planetary gear sets which permit an expansion of the ratio range, the requirement for precise positioning is significantly greater still, otherwise transmission ratios and/or speeds are reached which are not desired or not permitted.

To prevent this, the conical pulley transmissions are always produced with a considerable wear allowance, such that the operating point of the transmission combination remains in a permissible range even at the end of the service life of the traction mechanism belt.

Aside from the fact that the possible ratio range of the conical pulley transmission is considerably restricted in this way, there remains the risk that the transmission combination could nevertheless move into an undesired operating range in the event of unexpectedly high wear.

OBJECTS AND SUMMARY OF THE INVENTION

It is therefore an object of the present invention to further develop a continuously variable conical pulley transmission as specified above in such a way that, regardless of the wear of the traction mechanism belt, the transmission is prevented from moving, as described, to an inadmissible operating point.

The object is achieved according to the invention in that a stop for limiting the transmission ratio, which stop acts substantially in the radial direction on the traction mechanism belt, is provided in at least one conical pulley pair of the conical pulley transmission.

The object is achieved on the basis of the knowledge that an effective limitation of the ratio range independently in particular also of width wear of the traction mechanism belt is possible only if, instead, a direct determining factor of the transmission ratio is limited; in the present case, therefore, the running radii of the traction mechanism belt. In this case, the width wear of the traction mechanism belt specifically no longer influences the end transmission ratio, and the above-specified problem of the starting transmission ratio which varies in each case on account of wear over the service life of the traction mechanism belt is likewise solved.

Here, it is sufficient to define only one of the two running radii for the traction mechanism belt, since the other is set by means of the length of the traction mechanism belt. Here, it should also be taken into consideration that the variation in the length of the traction mechanism belt lies in a negligible order of magnitude in particular when said traction mechanism belt is a chain as described above.

The radial limitation of the chain running radius may fundamentally take place at the drive input and drive output disk sets.

In one preferred embodiment, it is proposed that the stop be provided on the drive input side.

The stop may fundamentally be formed as a step in at least one of the conical pulleys. The traction mechanism belt may then come only partially into contact with said step, for example also by means of rocker pins which are used in the case of a chain as a traction mechanism belt. The stop is, however, preferably formed by the peripheral surface of the drive input shaft. In this way, an operationally reliable solution is provided without it being necessary to provide steps which must be attached to the conical pulleys with an increased level of expenditure.

Here, it also falls within the scope of the invention for the peripheral surface of the drive input shaft to be geometrically matched to the corresponding requirements by means of a sleeve or the like.

As already discussed, a traction mechanism belt which is preferably used for the conical pulley transmission described here is a chain with a multiplicity of links which are connected to one another by means of rocker pins.

It has hitherto been conventional in this context to prevent the chain from mechanically running against the drive input shaft, in order to prevent undesired wear, noises etc. here. In order that this does not lead to problems in a conical pulley transmission as described above with a chain as a traction mechanism belt, it is also proposed that the links of a chain of said type be provided, on their side facing toward the shafts, with a contour which is matched to the geometry of the drive input shaft.

Here, it is firstly possible for curved sections to be provided, the radius of curvature of which corresponds to the radius of the drive input shaft.

It is however also possible for that contour of the links which faces toward the shaft to be provided with a plurality of contact points which lie on a circular arc which corresponds to the radius of the drive input shaft. In particular two contact points are provided. More contact points are however also possible within the context of the present invention. Said contact points are particularly protected against wear in particular by local hardening, heat treatment or the like.

It should be mentioned here that, in the case of chains which are produced with a plurality of parallel links, it is also sufficient for merely some of said plurality of links to have a contour which is matched to the geometry of the drive input shaft if said contour projects beyond the parallel, adjacent links which are not provided with a contour of said type.

BRIEF DESCRIPTION OF THE DRAWINGS

Further advantages and features of the invention can be gathered from the following description of an exemplary embodiment, in which.

DETAILED DESCRIPTION

Figure 1:
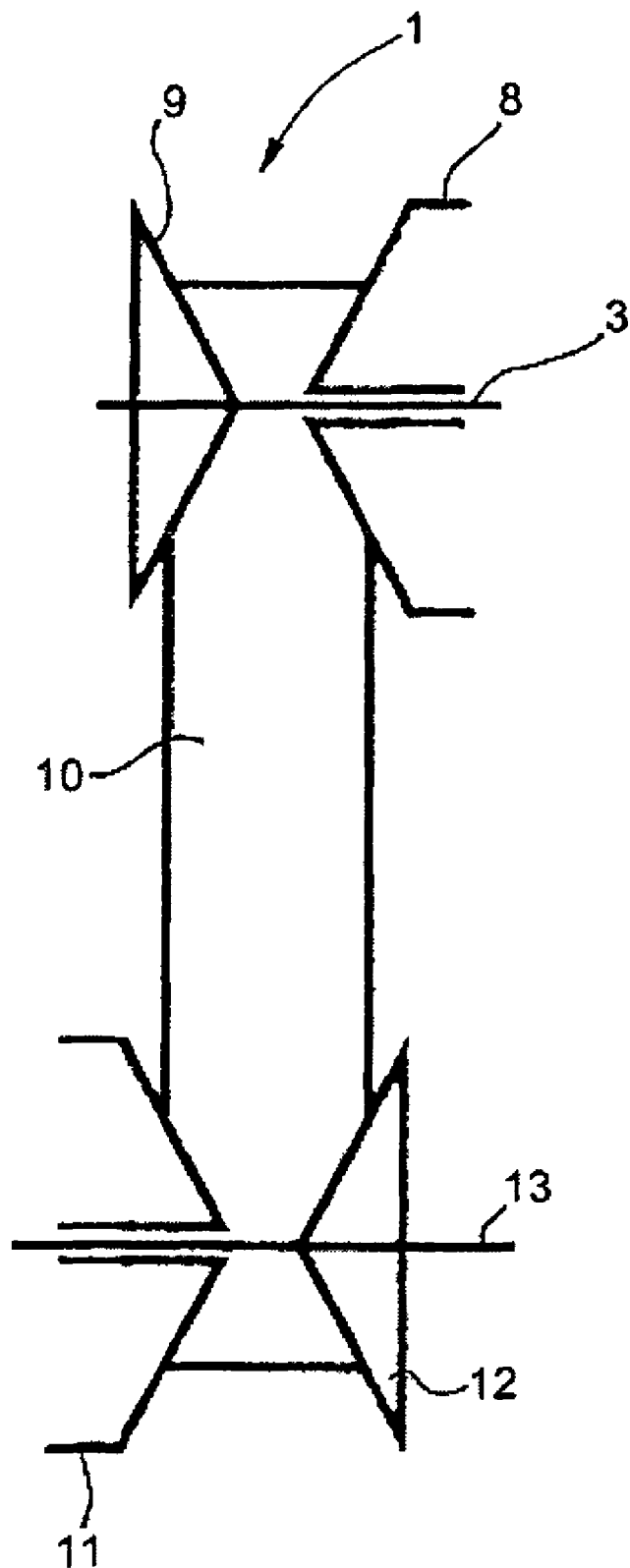
FIG. 1 shows a diagrammatic sketch of a continuously variable conical pulley transmission.

FIG. 1 shows a diagrammatic sketch of a continuously variable conical pulley transmission 1.

The conical pulley transmission 1 has a drive input shaft 3 which is connected to a drive motor (not illustrated).

In specific applications, critical transmission ratios of said type should be avoided.

For critical transmission ratios of said type, the minimum running radius of the traction mechanism 10 on the conical pulley pairs 8, 9 and 11, 12 is in particular also of significance, depending on the application, as is explained below on the basis of FIGS. 2-4.

It is possible here to see in each case the drive input shaft 3 which is fixedly connected to a conical pulley 9, while the other conical pulley 8 which belongs to the conical pulley pair can be adjusted axially by means of hydraulics (not illustrated).

Figure 2:
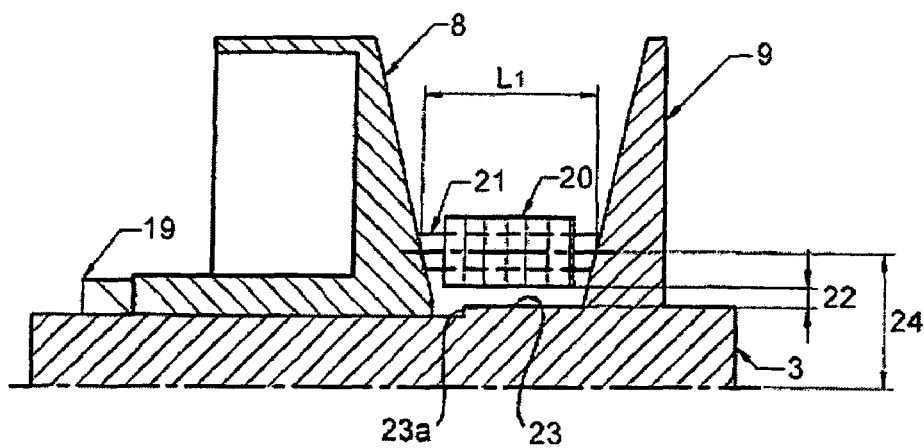
FIGS. 2, 3 and 4 show a conical pulley set at its maximum opening extent in different phases of the service life of the traction mechanism belt.
Figure 3:
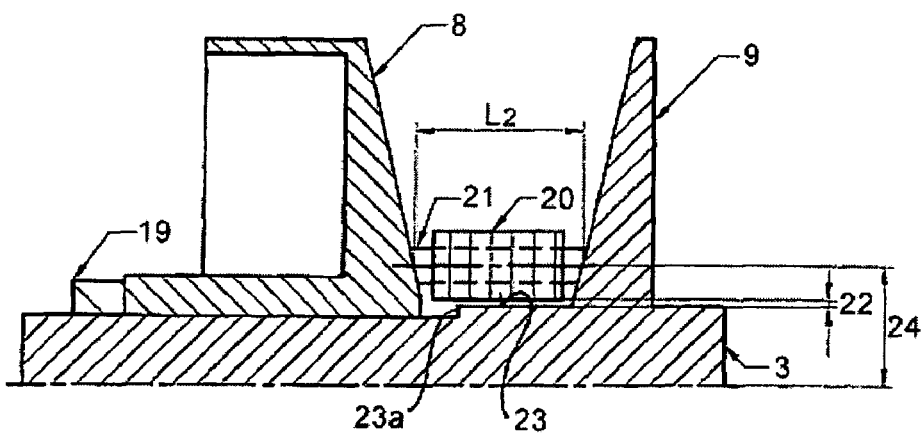
Figure 4:
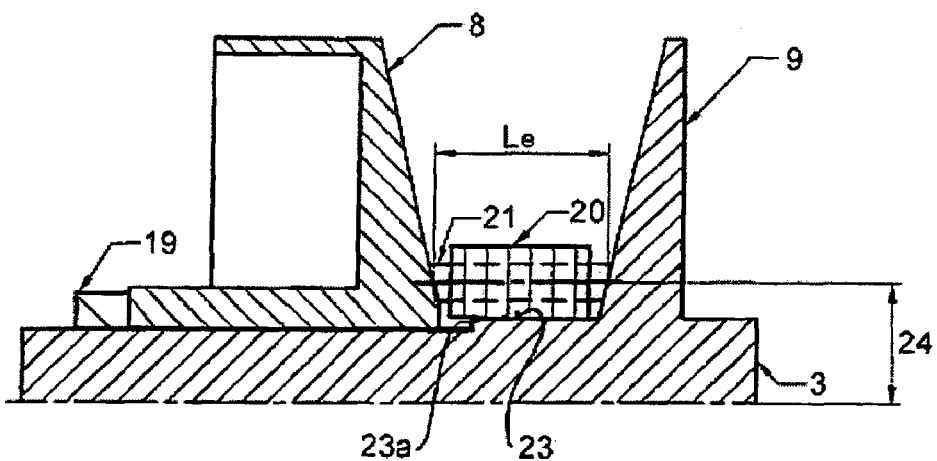

Here, FIGS. 2-4 show the axially adjustable conical pulley 8 in each case in its maximum open position in which it comes to bear against a stop 19 which, by means of its position, determines the maximum opening extent of the conical pulley pair 8, 9. This substantially corresponds to the conventional method of limiting the transmission ratio by means of axial stops of the conical pulleys.

A traction mechanism belt in the form of a chain is guided between the conical pulleys 8, 9. Said chain is composed of links 20 which, at their ends, are connected by means of rocker pins 21. The transmission of power from the traction mechanism belt to the conical pulleys 8, 9 takes place here by means of the pressure forces between the end sides of the rocker pins 21 and the conical surfaces of the conical pulleys 8, 9.

Over the course of their service life, the rocker pins 21 become worn, such that their effective length decreases from an original length $L_1$ via a length $L_2$ to an end length $L_E$. Said lengths are illustrated in FIGS. 2, 3 and 4.

It can be seen here that the spacing 22 of the rocker pins 21 from the peripheral surface 23 of the drive input shaft 3 continuously decreases with increasing wear, until—as illustrated in FIG. 4—said spacing becomes zero and the links 20 of the traction mechanism bear directly against the peripheral surface 23 of the drive input shaft 3. With the spacing 22, the minimum running radius 24 of the traction mechanism belt in the conical pulley pair 8, 9 likewise decreases.

In the conical pulley transmission described here, it is now ensured that, even at the minimum possible running radius 24, as illustrated in FIG. 4, at which the links 20 bear against the peripheral surface 23 of the drive input shaft 3, the resulting transmission ratio is still permissible.

This is achieved in that a step 23a is formed into the peripheral surface of the drive input shaft, the radial extent of which in relation to the drive input shaft 3 is selected according to requirements.

Figure 5:
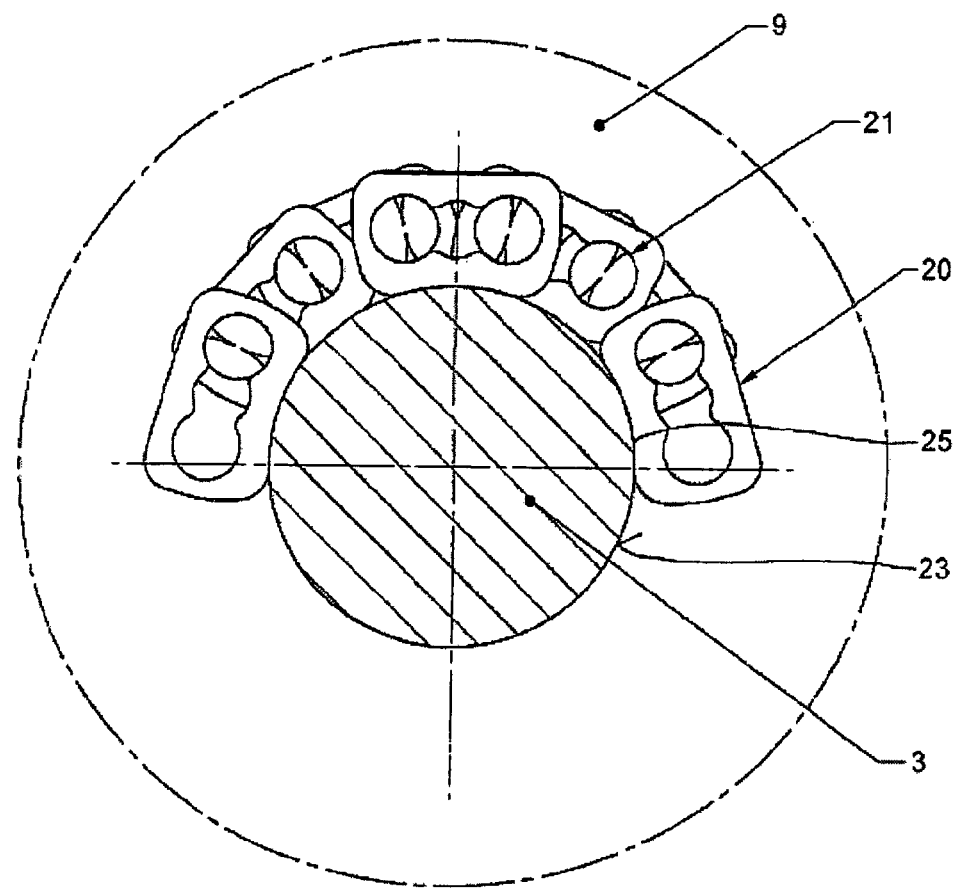
FIG. 5 shows a section through a shaft of a conical pulley transmission with a traction mechanism belt bearing against the shaft.

In order that, in the situation illustrated in FIG. 4, no undesirably high pressures occur between the links 20 and the peripheral surface 23 of the drive input shaft 3, that side of the links 20 which faces toward the drive input shaft 3 is matched in terms of its contour 25 to the radius of the drive input shaft 3, such that contact pressures which may occur can be distributed over a larger area of contact of the contour 25 against the peripheral surface 23 of the drive input shaft 3. This is illustrated in FIG. 5.

Furthermore, the links 20 are hardened or heat-treated in the region of the contour 25 in order to be able to resist the possibly relatively high pressures and not wear in an undesired fashion.

In this way, it is also possible for the entire running surface of the conical pulleys 8, 9 to be utilized for the adjustment of the transmission ratio, and it is not necessary, in particular in the radially inner region, to provide then substantially unutilized possible adjustment regions for any wear which may occur in order to be able to plan for safety margins. It is thus possible for the illustrated position to be used from the very start. In this way, the nominal ratio range is greater by the spacing 22 than has hitherto been conventional in the prior art. Furthermore, the pulleys may, if appropriate, be reduced in diameter, which leads to weight savings in the transmission and therefore, on account of reduced inertial masses, also to an improved reaction speed and improved efficiency.

Figure 6:
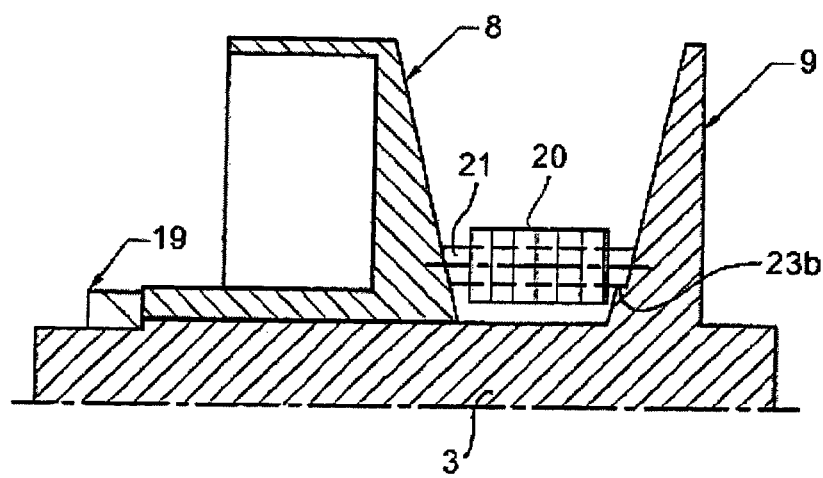
FIG. 6 shows a conical pulley set at its maximum opening extent with a step formed on one conical pulley.

Instead of providing the above-described step 23a in the peripheral surface 23 which extends parallel to the central axis of the drive input shaft 3, said step may also be formed, as illustrated in FIG. 6 as step 23b, on the conical pulley 9.

In this case, the drive input shaft then comes into contact not with its links 20 but rather with its rocker pins 21 which are restricted in terms of their movement in the radial direction by the step 23b.

Having described exemplary embodiments of the invention with reference to the accompanying drawings, it will be appreciated that the present invention is not limited to those embodiments, and that various changes and modification can be effected therein by one of ordinary skill in the art without departing from the scope or spirit of the invention as defined by the appended claims.

What is claimed:

1. A continuously variable conical pulley transmission comprising a pair of conical pulleys which are rotationally fixedly arranged on drive input and drive output shafts, and of which in each case one of the pairs of conical pulleys is fixed to the drive input shaft and one of the pairs of conical pulleys is axially movable, and between which a traction mechanism belt for power transmission circulates, and a stop for limiting a transmission ratio of the conical pulley transmission, said stop acting substantially in the radial direction on the traction mechanism belt, when the conical pulley transmission is in operation, wherein the stop is formed as a step on the peripherial surface of the drive input shaft.

2. The continuously variable conical pulley transmission according to claim 1, wherein the chain comprises a multiplicity of links which are connected to one another by means of rocker pins, with the links having, at their side facing toward the shafts, a contour which is matched to the shaft geometry.

3. The continuously variable conical pulley transmission according to claim 2, wherein the contour has curved sections corresponding to the radius of the drive input shaft.

4. The continuously variable conical pulley transmission according to claim 3, wherein the links are hardened or heat-treated in the region of the matched contour.

5. The continuously variable conical pulley transmission according to claim 2, wherein the contour has a plurality of contact points which lie on a circular arc which corresponds to the radius of at least one of the drive input shaft and the drive output shaft.

6. The continuously variable conical pulley transmission according to claim 5, wherein the links are hardened or heat-treated in the region of the matched contour.

7. The continuously variable conical pulley transmission according to claim 1,
   wherein the traction mechanism belt comprises a chain with rocker pins via which force is transmitted from the traction mechanism belt to the pair of conical pulleys, and
   wherein the stop for limiting a transmission ratio of the conical pulley transmission acts substantially in a radial direction on said rocker pins of the traction mechanism belt.

8. The continuously variable conical pulley transmission according to claim 1,
   wherein the width wear of the traction mechanism belt does not influence the transmission ratio.

\* \* \* \* \*